United States Patent
Christensen et al.

(10) Patent No.: US 11,216,633 B2
(45) Date of Patent: Jan. 4, 2022

(54) FINGERPRINT SENSING ARRANGEMENT AND A METHOD FOR FILTERING A FINGERPRINT PATTERN SIGNAL

(71) Applicant: Fingerprint Cards AB, Gothenburg (SE)

(72) Inventors: Lars Christensen, Charlottenlund (DK); Hans Thörnblom, Kungsbacka (SE); Frank Riedijk, Delft (NL); Søren Skovgaard Christensen, Dyssegaard (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/979,300

(22) PCT Filed: Mar. 4, 2019

(86) PCT No.: PCT/SE2019/050186
§ 371 (c)(1),
(2) Date: Sep. 9, 2020

(87) PCT Pub. No.: WO2019/177512
PCT Pub. Date: Sep. 19, 2019

(65) Prior Publication Data
US 2020/0401778 A1 Dec. 24, 2020

(30) Foreign Application Priority Data
Mar. 14, 2018 (SE) .................... 1850282-3

(51) Int. Cl.
*G06K 9/00* (2006.01)
*G06F 3/044* (2006.01)
(Continued)

(52) U.S. Cl.
CPC ......... *G06K 9/0002* (2013.01); *G06F 3/0445* (2019.05); *G06F 3/04144* (2019.05); *G06F 17/145* (2013.01); *G06K 9/40* (2013.01)

(58) Field of Classification Search
CPC .......... G06K 9/0002; G06K 9/40; G06K 9/56; G06F 3/0445; G06F 3/04144; G06F 17/145
See application file for complete search history.

(56) References Cited

U.S. PATENT DOCUMENTS 8,888,004 B2  11/2014  Setlak et al.
9,600,707 B1  3/2017  Ramberg et al.
(Continued)

FOREIGN PATENT DOCUMENTS

EP  2184700 A2  5/2010
WO  2012063520 A1  5/2012
(Continued)

OTHER PUBLICATIONS

Heo, Sanghyun: "Design of Touch Screen Controller IC for Transparent Fingerprint Sensor" ;Dec. 12, 2017, Graduate School of UNIST; http://unist.dcollection.net/public_resource/pdf/200000010333_20210521031547.pdf ; pp. 4-24 (Year: 2017).*

(Continued)

*Primary Examiner* — Jonathan A Boyd
(74) *Attorney, Agent, or Firm* — RMCK Law Group, PLC (57) ABSTRACT

The present invention relates to providing a filtered fingerprint pattern signal indicative of a fingerprint pattern with a fingerprint sensing device comprising an array of sensing elements for sensing the fingerprint pattern. Each sensing element is configured to provide a sensing signal indicative of a local fingerprint pattern feature. The method comprises: receiving analog sensing signals from each of a set of
(Continued)

sensing elements comprising at least four sensing elements, filtering the set of sensing signals to provide a set of filtered output signals each comprising a linear combination of the set of sensing signals in which each sensing signal has a respective coefficient. The coefficients in each linear combination sum up to zero, and wherein the linear combinations are different from each other. The set of filtered output signals are converted to a filtered digital sensing signal indicative of the user's fingerprint pattern.

9 Claims, 7 Drawing Sheets

(51) Int. Cl.
    *G06F 3/041*     (2006.01)
    *G06F 17/14*     (2006.01)
    *G06K 9/40*     (2006.01)

(56) References Cited

U.S. PATENT DOCUMENTS

2013/0021294 A1    1/2013    Maharyta et al.
2016/0012271 A1    1/2016    Hansen et al.
2016/0117049 A1*    4/2016    Sagawai ............ G06F 3/04166
                                                      345/174
2016/0148034 A1    5/2016    Kremin et al.

FOREIGN PATENT DOCUMENTS

WO    2013001954 A1    1/2013
WO    2016085560 A1    6/2016
WO    2017196239 A1    11/2017

OTHER PUBLICATIONS

Extended European Search Report dated Mar. 12, 2021 for EP Application No. 19768670.2, 7 pages.
Heo, S., "Design of Touch Screen Controller IC for Transparent Fingerprint Sensor," Doctoral Thesis, Ulsan National Institute of Science and Technology, Dec. 12, 2017, 108 pages.
PCT International Search Report and Written Opinion dated Mar. 28, 2019 for International Application No. PCT/SE2019/050186, 11 pages.

\* cited by examiner

FINGERPRINT SENSING ARRANGEMENT AND A METHOD FOR FILTERING A FINGERPRINT PATTERN SIGNAL

CROSS-REFERENCE TO RELATED APPLICATIONS

This application is a 371 U.S. National Stage of International Application No. PCT/SE2019/050186, filed Mar. 4, 2019, which claims priority to Swedish Patent Application No. 1850282-3, filed Mar. 14, 2018. The disclosure of each of the above applications are incorporated herein by reference in their entirety.

FIELD OF THE INVENTION

The present invention relates to a method for providing a filtered fingerprint pattern signal and to a fingerprint sensing arrangement for sensing a fingerprint pattern of a user's finger for providing a fingerprint pattern signal.

BACKGROUND OF THE INVENTION

Various types of biometric systems are used more and more in order to provide for increased security and/or enhanced user convenience. In particular, fingerprint sensing systems have been adopted in, for example, consumer electronic devices, thanks to their small form factor, high performance and user acceptance.

Fingerprint sensors are generally comprised of a pixel array which is configured to sense the fingerprint pattern of a finger. Signals from each of the pixel elements are collected and subsequently processed to form a fingerprint image. Ideally, the final fingerprint image is a low noise high resolution fingerprint image which can be used for fingerprint recognition applications and that can be acquired relatively fast.

However, forming a high quality fingerprint image is associated with a number of challenges. For example, the absolute signal level from each pixel element depends on several more or less uncontrollable factors such as the pressure of the finger on the pixel array and the level of humidity of the finger. A relatively successful way to sample an appropriate signal level is to adjust the signal offset and signal gain.

A further challenge is to handle common mode noise which may affect the absolute noise level in the signals. For example, sensing the fingerprint with a capacitive sensor under a thick stack-up/glass is challenging due to the relatively small capacitance changes caused by the fingerprint. Since the common capacitance of the finger is typically significantly larger than the modulation caused by the fingerprint ridges and valley, the analog signal being measured will contain a large common-mode signal with only a small variation on top due to the fingerprint. Since the common-mode signal carries no discriminative information for fingerprint recognition, it is desirable to remove this in the analog domain by e.g. spatial differential sampling to enable a reduced analog dynamic range and a larger effective gain. A further benefit of such a spatially differential sampling is that any common-mode noise is eliminated or at least significantly reduced.

U.S. Pat. No. 8,888,004 discloses a fingerprint sensing device which employs a differential sensing scheme which generates inter-pixel difference measurements for adjacent pairs of finger sensing pixels.

Although the solution proposed by U.S. Pat. No. 8,888,004 seems to provide for acquiring fingerprint images with reduced influence to the common-mode noise, such differential sampling can generally be viewed as a spatial high-pass filter, which means that it significantly attenuates the lower half of the frequency spectrum of the image as given by the spatial separation between pixels. This high-pass property of the differential sampling is undesired since frequency components that carry discriminative fingerprint information may be attenuated.

Accordingly, there is a need for common-mode noise reduction with reduced loss in fingerprint information when acquiring fingerprint images using a pixel array.

SUMMARY

In view of above-mentioned and other drawbacks of the prior art, it is an object of the present invention to provide for sensing of a fingerprint pattern with improved common mode noise suppression with reduced loss in fingerprint information.

According to a first aspect of the present invention, there is provided a method for providing a filtered fingerprint pattern signal indicative of fingerprint pattern of a user's finger with a fingerprint sensing device comprising an array of sensing elements for sensing the fingerprint pattern, each sensing element is configured to provide a sensing signal indicative of a local fingerprint pattern feature, wherein the method comprises: receiving analog sensing signals from each of a set of sensing elements comprising at least four sensing elements, filtering the set of sensing signals to provide a set of filtered output signals, each of the filtered output signals comprises a linear combination of the set of sensing signals in which each sensing signal has a respective coefficient, wherein the coefficients in each linear combination sum up to zero, and wherein the linear combinations are different from each other, and converting the set of filtered output signals to a filtered digital sensing signal indicative of the user's fingerprint pattern.

The present invention is based upon the realization to implement an analog filter structure prior to converting the analog fingerprint signal to a digital output signal. Further, the filtering structure relies on additions and subtractions of analog signals which simplify the filtering in the analog domain. Moreover, it was realized that by filtering in the way of forming linear combinations of analog sensing signals, it is possible to avoid sampling the common mode signal, which is the sum of all the sensing signals used in the linear combination. Accordingly, it becomes possible to avoid the common-mode noise but at the same time keep more fingerprint information contained in the other linear combinations of sensing signals.

The number of sensing elements in the set of sensing elements is preferably an even number of sensing elements. This enables using a Hadamard transformation for forming the linear combinations of sensing signals.

In some embodiments, the set of sensing elements is a first set of sensing elements, the method comprising: receiving sensing signals from a second set of sensing elements comprising at least four sensing elements, the sensing elements of the second set are not comprised in the first set of sensing elements, filtering the set of sensing signals from the second set of sensing elements to provide a further set of filtered output signals, each of the further filtered output signals comprises a linear combination of the set of sensing signals from the second set of sensing elements in which each sensing signal has a respective coefficient, wherein the coefficients in each linear combination sum up to zero, and wherein the linear combinations are different from each other, and converting the second set of filtered output signals to a second filtered digital sensing signal indicative of the user's fingerprint pattern, combining the first filtered digital sensing signal with the second filtered digital sensing signal.

Accordingly, two sets of filtered sensing signals are provided which enables to recover both horizontal and vertical fingerprint information by choosing the sets of sensing elements appropriately. The number of sensing elements in the first set may preferably be equal to the number of sensing elements in the second set.

Moreover, in order to provide good image quality in the image which may be reconstructed from the combined digital sensing signal, the first set of sensing signals and the second set of sensing signals may be acquired substantially simultaneously.

In some embodiments, the method may comprise shifting the set of sensing element to a further set of sensing element overlapping with at least one sensing element from the first set of sensing element, and providing a further filtered digital sensing signal based on sensing signals from the further set of sensing elements. The shifting may be performed by a shifting the block of sensing elements in the first set one block in the horizontal direction in the array. This provides one advantageous way of enabling sampling from different sets of sensing elements that are connected together which is a requirement for good image quality, once an image is reconstructed form the filtered sensing signals.

The filtering may comprise computing a Hadamard transform of the each set of sensing signals. The matrix which represents a Hadamard transformation is a so-called complete basis which means no information is lost when transforming a set of sensing signals. One output from a Hadamard transform is the sum of the inputs, thus, the sum output from the Hadamard is not sampled in order to avoid the common-mode signal. The sum output may thus be discarded.

According to a second aspect of the present invention there is provided a fingerprint sensing arrangement for sensing a fingerprint pattern of a user's finger for providing a fingerprint pattern signal, the fingerprint sensing arrangement comprising: an array of sensing elements for sensing the fingerprint pattern, each sensing element is configured to provide a sensing signal indicative of a local fingerprint pattern feature, a filter bank configured to receive analog sensing signals from each of a set of sensing elements comprising at least four sensing elements, the filter bank is further configured to calculate a set of filtered output signals, each of the filtered output signals comprises a linear combination of the set of sensing signals in which each sensing signal is associated with a respective coefficient, wherein the coefficients in each linear combination sum up to zero and wherein the linear combinations are different from each other, and an analog to digital converter configured to convert the set of filtered output signals to a filtered digital sensing signal indicative of the user's fingerprint pattern.

The filter bank may comprise a plurality of adding circuits and a plurality of subtraction circuits for calculating the set of filtered output signals.

In some embodiments, the filter bank may advantageously be configured to compute a Hadamard transform of the set of sensing signals.

In case of employing a Hadamard transform, the filter bank may be configured to discard a sum output from the Hadamard transform comprising the sum of the set of sensing signals.

Each sensing element may comprise: a sensing structure for capacitive coupling with the finger, each sensing structure being covered by a dielectric structure, and sensing circuitry for providing the sensing signals which are indicative of the capacitive coupling between the sensing structure and the finger in response to a change in potential difference between a sensing structure potential of the sensing structure and a finger potential of the finger.

Accordingly, the sensing elements may, for example, be capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

Moreover, each sensing structure may advantageously be provided in the form of a metal plate, so that the equivalence of a parallel plate capacitor is formed by the sensing structure (the sensing plate), the local finger surface, and the protective dielectric top layer (and any air that may locally exist between the local finger surface and the protective layer, depending on location of ridges and valleys in the fingerprint pattern). A change of the charge carried by the sensing structure resulting from the change in potential difference between the finger and the sensing structure is an indication of the capacitance of such a parallel plate capacitor, which is in turn an indication of the distance between the sensing structure and the finger surface. Thereby, an image of the fingerprint pattern can be acquired by means of determining the capacitive coupling between each sensing structure and the finger.

The protective top dielectric structure, which also may be referred to as a coating, may advantageously be at least 20 µm thick and have a high dielectric strength to protect the underlying structures of the fingerprint sensing device from wear and tear as well as from electrostatic discharge (ESD). Even more advantageously, the protective top layer may be approximately 100 µm thick, or in the range of 500-700 µm thick, or even thicker.

The signals may be analog values indicative of a voltage, which may in turn be proportional to the capacitance of the capacitor constituted by the finger (or other conductive object in the vicinity of the finger detecting structure), the finger detecting structure and the dielectric material there between.

The sensed fingerprint pattern may be used for various purposes, such as biometric enrollment or authentication, or fingerprint pattern based navigation etc.

The sensing circuitry may be a charge amplifier connected to at least one of the sensing structures for providing the sensing signal indicative of a change in charge carried by the at least one sensing structure, wherein each of the charge amplifiers comprises: a first input connected to the at least one sensing structure; a second input configured to receive a sensing reference potential (GND, or drive); an output providing the sensing signal; a feedback capacitor connected between the first input and the output; and at least one amplifier stage between the first and second inputs, and the output. The charge amplifier may be configured in such a way that a potential at said first input substantially follows said sensing reference potential at said second input.

The fingerprint arrangement may be comprised in an electronic device, comprising processing circuitry configured to receive the fingerprint pattern signal and reconstruct a fingerprint image based on the fingerprint pattern signal.

The fingerprint sensing arrangement may be part of a capacitive fingerprint sensor. The electronic device may be a mobile device such as a mobile phone, but may also be e.g. a desktop computer, tablet, smart card etc.

Further embodiments of, and effects obtained through this second aspect of the present invention are largely analogous to those described above for the first aspect of the invention.

In summary, the present invention relates to providing a filtered fingerprint pattern signal indicative of a fingerprint pattern with a fingerprint sensing device comprising an array of sensing elements for sensing the fingerprint pattern. Each sensing element is configured to provide a sensing signal indicative of a local fingerprint pattern feature. The method comprises: receiving analog sensing signals from each of a set of sensing elements comprising at least four sensing elements, filtering the set of sensing signals to provide a set of filtered output signals each comprising a linear combination of the set of sensing signals in which each sensing signal has a respective coefficient. The coefficients in each linear combination sum up to zero, and wherein the linear combinations are different from each other. The set of filtered output signals are converted to a filtered digital sensing signal indicative of the user's fingerprint pattern.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly described with reference to a mobile device in the form a mobile phone having an integrated fingerprint sensing device. However, it should be noted that many other kinds of electronic devices may have such a fingerprint sensing device integrated, such as tablets, desktop computers, laptops, smart cards, etc.

Figure 1:
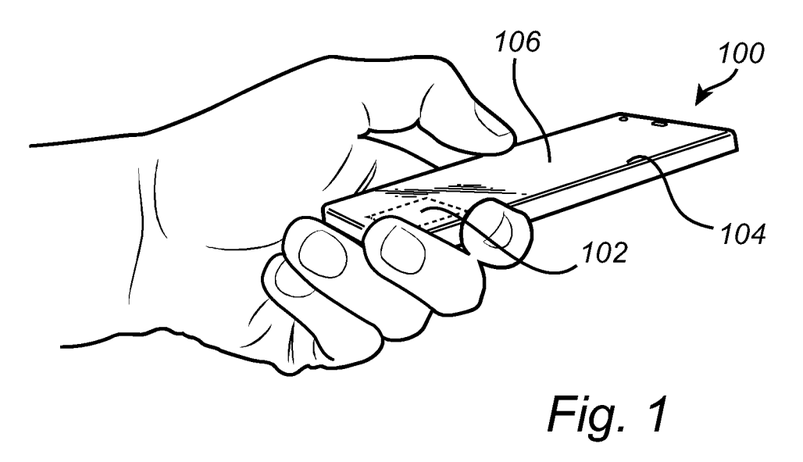
FIG. 1 schematically illustrates an application for a fingerprint sensing device according to an example embodiment of the present invention.

Turning now to the drawings and in particular to FIG. 1, there is schematically illustrated an example of an electronic device configured to apply the concept according to the present disclosure, in the form of a mobile device 100 with an integrated fingerprint sensor 102 and a display unit 104 with a touch screen interface 106. In this embodiment the fingerprint sensor 102 is arranged on a front side of the mobile device 100, where also the display unit 104 is positioned. The fingerprint sensor 102 may, for example, be used for unlocking the mobile device 100 and/or for authorizing transactions carried out using the mobile device 100, etc. The fingerprint sensor 102 may of course also be placed on the back side or on the side of the mobile device 100.

Preferably and as is apparent for the skilled person, the mobile device 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices, such as a laptop, a remote control, a tablet computer, smart card comprising a fingerprint sensor, or any other type of present or future similarly configured device, including any type of embedded devices or IoT (Internet of Things) devices where there is a desire to allow for user specific settings and/or identification/authentication of a user to be implemented.

Figure 2:
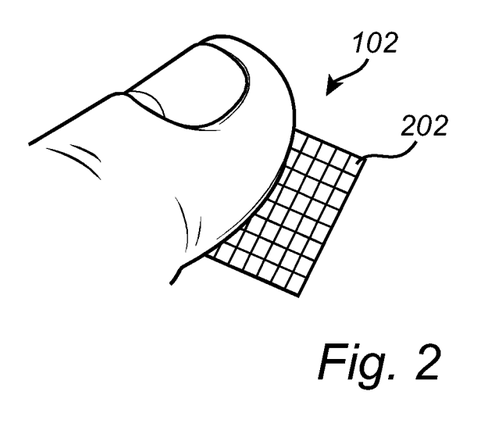
FIG. 2 schematically shows the fingerprint sensing device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3:
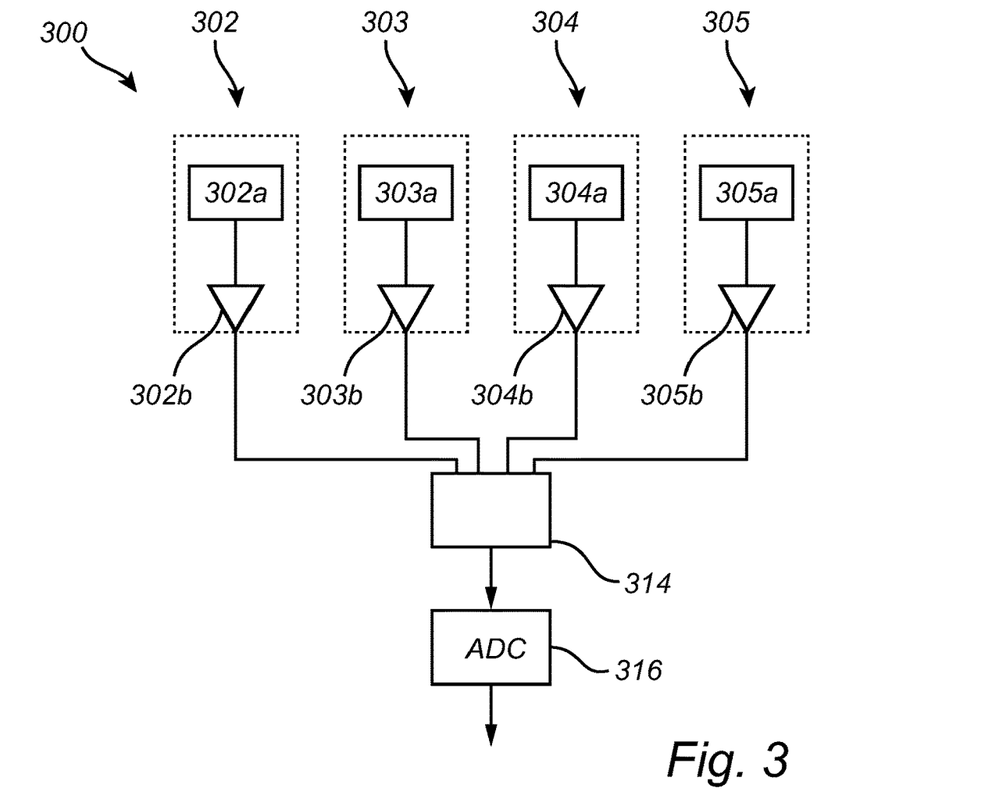
FIG. 3 is a conceptual illustration of embodiments of the invention.

FIG. 3 conceptually illustrates four sensing elements 302, 303, 304, and 305 of a fingerprint sensing arrangement 300. Each sensing element comprises a sensing structure 302a, 303a, 304a, 305a, and a sensing circuitry 302b, 303b, 304b, 305b illustrated as a simple amplifier for simplicity and clarity in the drawing. A filter bank 314 is configured to receive analog sensing signals from the sensing circuitries 302b, 303b, 304b, 305b and to calculate a set of filtered sensing signals based on the received analog sensing signals. The set of sensing signals are provided to an analog-to-digital converter 316 which converts the set of filtered output signals to a filtered digital sensing signal.

Figure 4:
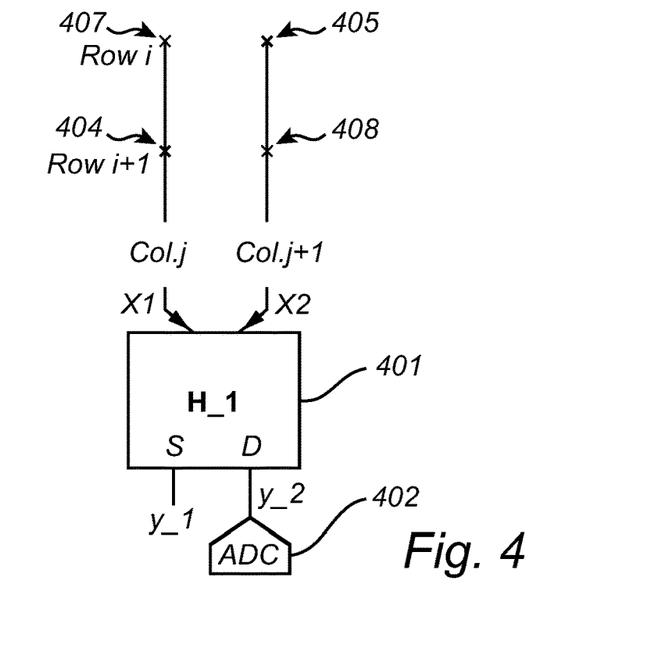
FIG. 4 conceptually illustrates a single layer Hadamard filter structure.

FIG. 4 conceptually illustrates a single layer Hadamard filter structure 401 which is configured to receive two analog sensing signals $x_1$ and $x_2$ from two sensing elements, either 404 and 405, or 407 and 408, where sensing elements 404 and 407 are arranged in different rows but in the same column j in an array of sensing elements. Similarly, sensing elements 405 and 408 are arranged in different rows but in the same column j+1 in an array of sensing elements. The Hadamard filter structure transforms the input signals according to a transformation given by the matrix operation:

$$\underbrace{\begin{bmatrix} y_1 \\ y_2 \end{bmatrix}}_{y} = \underbrace{\begin{bmatrix} 1 & 1 \\ 1 & -1 \end{bmatrix}}_{H_1} \underbrace{\begin{bmatrix} x_1 \\ x_2 \end{bmatrix}}_{x},$$

where the matrix $H_1$ comprises a sum and a difference operator. Thus, the output $y_1$, is the sum (S) of the inputs $x_1$ and $x_2$, and the output $y_2$ is the difference (D) between $x_1$ and $x_2$. The difference output $y_2$ is provided to an analog-to-digital converter 402 whereas the sum output $y_1$ is discarded. To recover both horizontal and vertical information, the sampling must alternate between sampling more than one set of sensing elements. In order to connect all the samples together, the sampling may e.g. be shifted horizontally by 1 sensing element between measurements. For example, for the sensing elements conceptually illustrated in FIG. 4, arranged in a number of rows and columns, the sensing signals from sensing elements 404 and 405 may be sampled first. Next, the sampling shifts to sampling the sensing signals from the sensing elements 407 and 408. Both sets of analog sensing signals from the two sampling steps are converted to respective set of digital sensing signals which are subsequently combined to form a filtered digital sensing signal indicative of the user's fingerprint pattern.

According to embodiments of the invention, the Hadamard transform is applied to at least four sensing signals for providing a set of filtered output signals. For simplicity, the case with four sensing signals will be explained herein. However, the inventive concept is equally applicable to larger number of sensing signals. The inventive filter bank concept can be extended to an arbitrary number of sensing elements (i.e. "pixels") $N=2^n$ by $$y = H_n x, H_n = H_1 \otimes H_{n-1},$$

where $\otimes$ denotes a Kroenke product.

Figure 5:
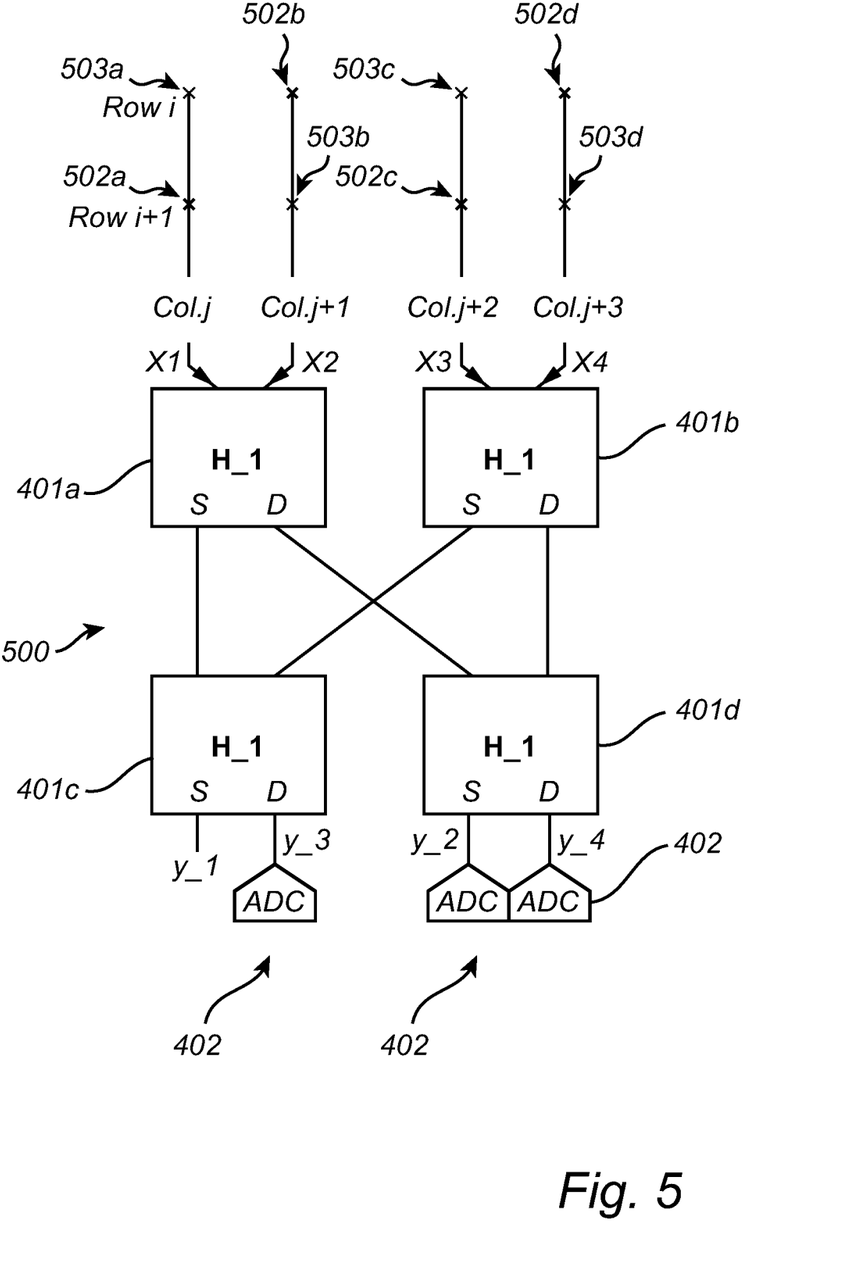
FIG. 5 conceptually illustrates a dual layer Hadamard filter structure according to embodiments of the invention.

FIG. 5 conceptually illustrates a dual layer Hadamard filter structure 500 comprising four Hadamard filter units 401a-d. One such filter unit 401 was described with reference to FIG. 4. The input to the Hadamard filter structure is four analog sensing signals X1, X2, X3, and X4. The Hadamard filter structure 500 transforms the input signals according to a transformation given by the matrix operation:

$$\underbrace{\begin{bmatrix} y_1 \\ y_2 \\ y_3 \\ y_4 \end{bmatrix}}_{y} = \underbrace{\begin{bmatrix} 1 & 1 & 1 & 1 \\ 1 & -1 & 1 & -1 \\ 1 & 1 & -1 & -1 \\ 1 & -1 & -1 & 1 \end{bmatrix}}_{H_2 = H_1 \otimes H_1} \underbrace{\begin{bmatrix} x_1 \\ x_2 \\ x_3 \\ x_4 \end{bmatrix}}_{x},$$

where the matrix $H_2$ is the Kroenke product of two $H_1$ transformation matrices. The outputs from the Hadamard filter structure 500 illustrated in FIG. 5 are the linear combinations:

$y_1 = X1 + X2 + X3 + X4$, $y_2 = X1 + X2 - (X3 + X4)$, $y_3 = X1 - X2 + X3 - X4$, and $y_4 = X1 - X2 - (X3 - X4)$.

In order to avoid sampling the common mode noise, the output $y_1$ is discarded. Thus, only the outputs $y_2$, $y_3$, and $y_4$ are converted to digital signals by the analog-to-digital converter 402.

As was described with reference to FIG. 4, to recover both horizontal and vertical fingerprint information, the sampling may alternate between sampling two sets of sensing elements. In this illustrated example, the first set of sensing elements may be the sensing elements 502a-d and the second set of sensing elements may be the sensing elements 503a-d. As for differential sampling, the sensing element sets are preferably connected together, which may be done by e.g. shifting the sampling horizontally by one block of sensing elements, i.e. by shifting over two sensing elements in this presently illustrated example in FIG. 5. To support this block-wise shifting of the sampling, multiplexers may be used to make the connections between the layers of filter units (e.g. 401a-b is one layer and 401c-d is another layer).

Shifting of the sampling between blocks of sensing elements may be performed through-out the entire array of sensing elements (e.g. the two-dimensional array shown in FIG. 2). In this way a fingerprint image may be reconstructed from the filtered sensing signals and may be used for various purposes, such as biometric enrollment or authentication, or fingerprint pattern based navigation etc.

Each of the filter units 401a-b may comprise addition circuits and subtraction circuits. The filter units 401a-b may be configured in various ways. For exemplary purposes is one such example filter circuit illustrated in FIG. 6.

Figure 6:
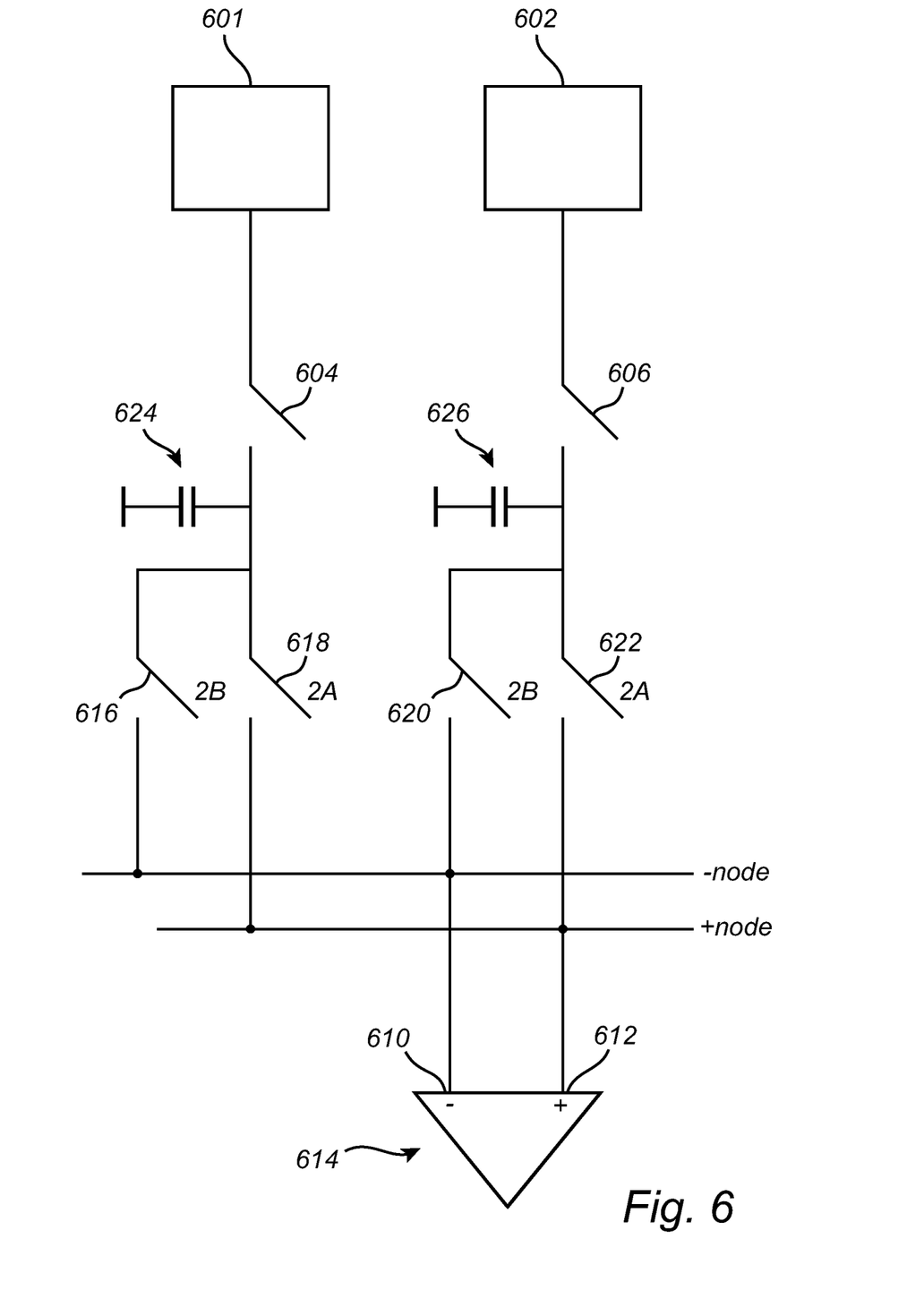
FIG. 6 conceptually illustrates an example filter circuit.

FIG. 6 illustrates two sensing structures 601 and 602 each being connected to a respective switch circuit 604 and 606. The switch circuits 604 and 606 are used for selecting the sensing structures to from which signals are measured. The signal sensed (i.e. related to the charge at the sensing structure) at the sensing structure 601 is provided to a negative input 610 or a positive input 612 of a buffer circuit 614 by controlling the switching circuits 616 and 618. In the same way, the signal sensed (i.e. related to the charge at the sensing structure) by the sensing structure 602 is provided to the negative input 610 or the positive input 612 of the buffer circuit 614 by controlling the switching circuits 620 and 622. For example, the difference between the charge at sensing structure 601 and the charge at the sensing structure 602 can be sensed by closing switch 622, opening switch 620, closing switch 616, and opening switch 618. The sum between the charge at sensing structure 601 and the charge at the sensing structure 602 can be sensed by opening the switches 616 and 620, and closing the switches 618 and 622.

Optional capacitors 624 and 626 provide a possibility to provide different gains to the sensing signals from the respective sensing structure. For example, if the capacitance of the capacitors 624 and 626 are the same, an effective gain of 1 is obtained. However, if the capacitance of the capacitors 624 and 626 are different, then a corresponding effective gain given by the ratio of the capacitances of the capacitors 624 and 626 could be applied to the sensing signals. Applying different gain provides the possibility to for example reduce non-uniformity in a reconstructed fingerprint image based on the sensing signals. The coefficient for a sensing signal in the above linear combinations corresponds to the gain applied to the sensing signal.

Figure 7:
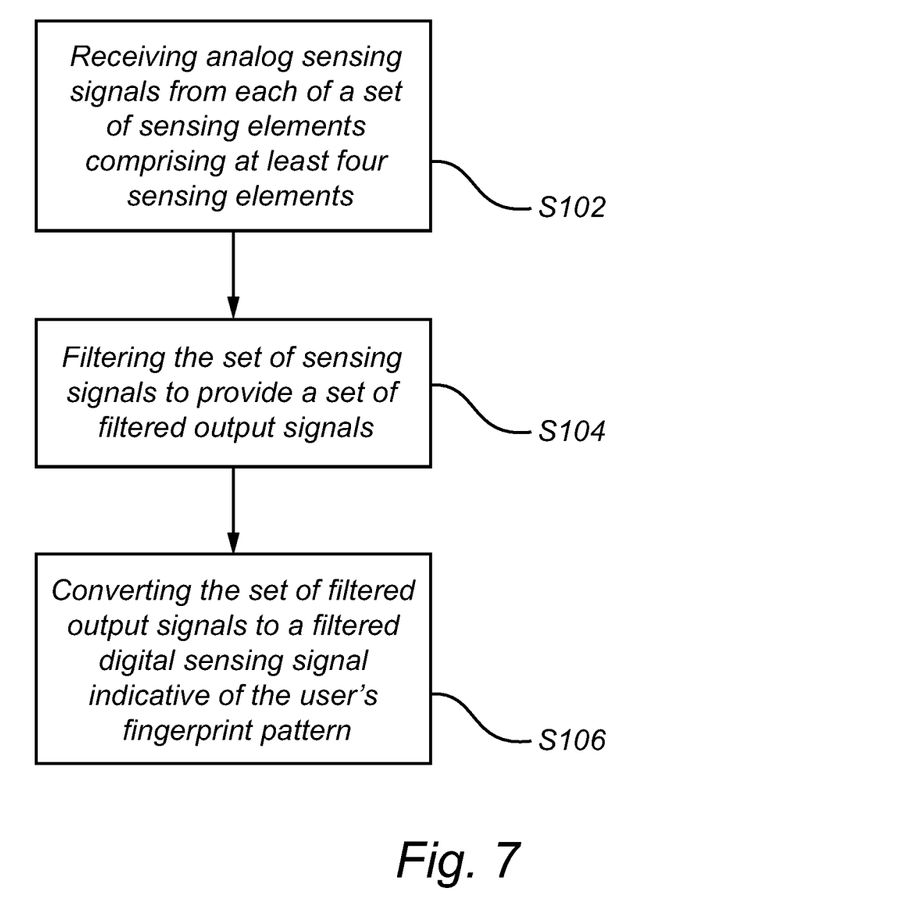
FIG. 7 is a flow-chart of method steps according to an embodiment of the present invention.

FIG. 7 shows a flow-chart of method steps according to embodiments of the invention. In step S102, analog sensing signals are received from each of a set of sensing elements comprising at least four sensing elements. The set of sensing signals is filtered in step S104 to provide a set of filtered output signals. Each of the filtered output signals comprises a linear combination of the set of sensing signals in which each sensing signal has a respective coefficient. The coefficients in each linear combination sum up to zero, and the linear combinations are different from each other. Next, in step S106, the set of filtered output signals are converted to a filtered digital sensing signal indicative of the user's fingerprint pattern. The filtering may be performed by computing a Hadamard transform of the set of sensing signals.

Figure 8:
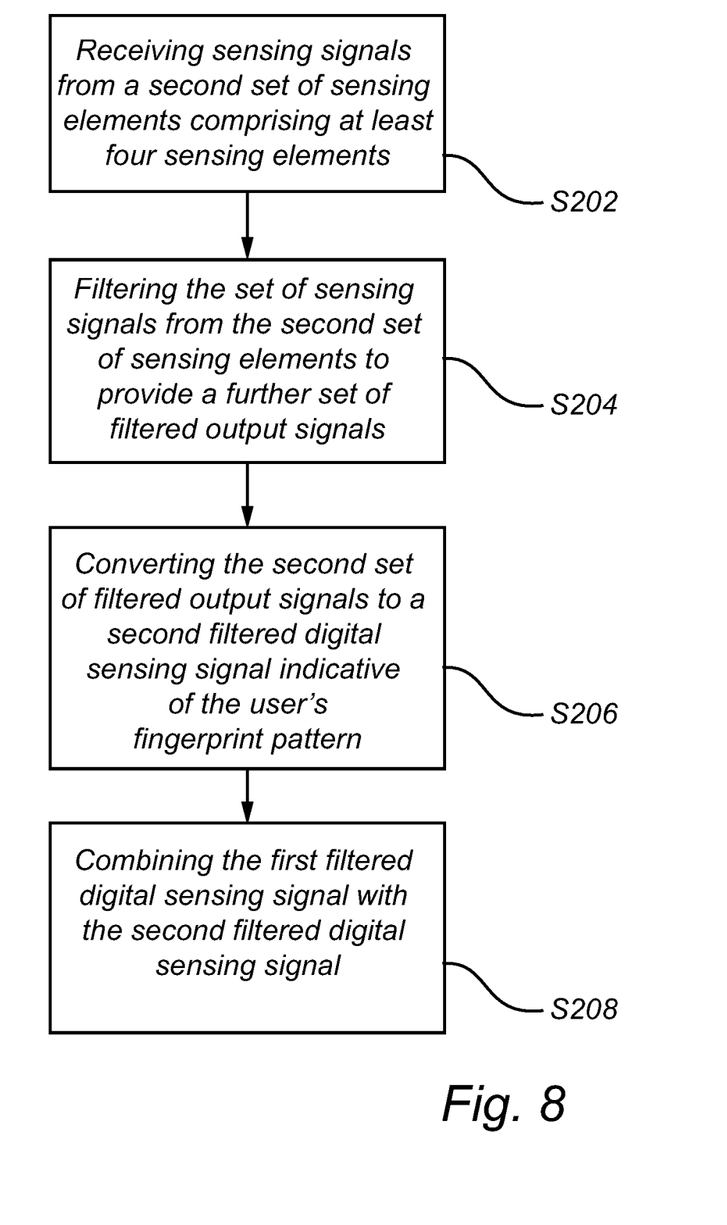
FIG. 8 is a flow-chart of method steps according to an embodiment of the present invention.

FIG. 8 shows a flow-chart with further method steps according to embodiments of the invention. In step S202, analog sensing signals are received from a second set of sensing elements comprising at least four sensing elements. The sensing elements of the second set are not comprised in the first set of sensing signals. The set of sensing signals from the second set of sensing elements are filtered in step S204 to provide a further set of filtered output signals. Each of the further filtered output signals comprises a linear combination of the set of sensing signals in which each sensing signal has a respective coefficient, wherein the coefficients in each linear combination sum up to zero. The linear combinations are different from each other. In step S206, the second set of filtered output signals are converted to a second filtered digital sensing signal indicative of the user's fingerprint pattern. Next, in step S208, the first filtered digital sensing signal is combined with the second filtered digital sensing signal to form a combined filtered digital sensing signal.

Figure 9:
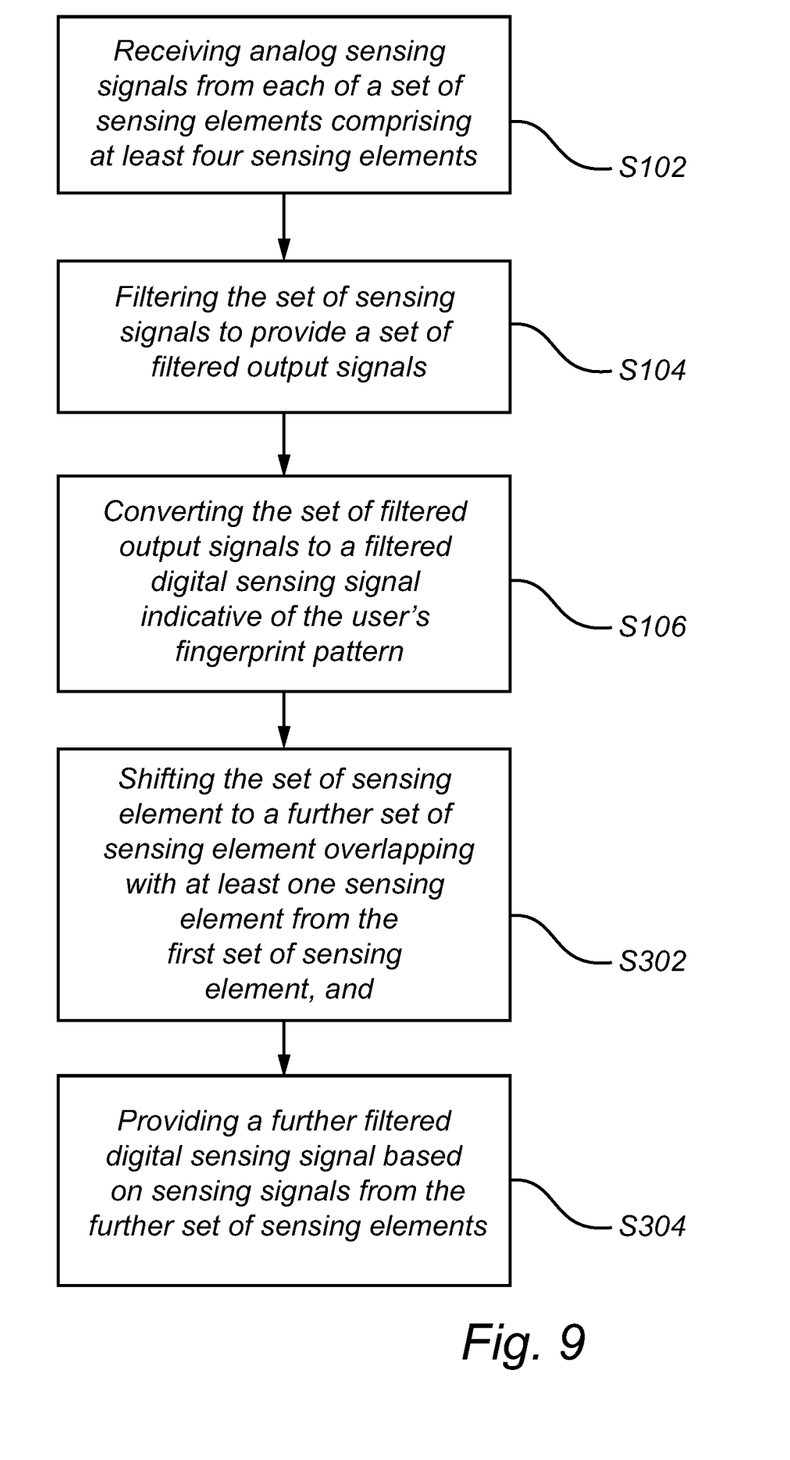
FIG. 9 is a flow-chart of method steps according to an embodiment of the present invention.

FIG. 9 is a flow-chart of further method steps according to an embodiment of the invention. The method steps S102, S104, and S106 are described above with reference to FIG. 7. In step S302, the set of sensing element from which the sensing signals are sensed are shifted to a further set of sensing element overlapping with at least one sensing element from the first set of sensing element. With the same methodology as in steps S104 and S106, a further filtered digital sensing signal is provided in step S304 based on sensing signals from the further set of sensing elements.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensing arrangement.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for providing a filtered fingerprint pattern signal indicative of fingerprint pattern of a user's finger with a fingerprint sensing device comprising an array of sensing elements for sensing the fingerprint pattern, each sensing element is configured to provide a sensing signal indicative of a local fingerprint pattern feature,
wherein the method comprises:
receiving analog sensing signals from each of a set of sensing elements comprising at least four sensing elements,
computing a Hadamard transform of each set of sensing signals for filtering the set of sensing signals for common mode noise suppression, and to provide a set of filtered output signals, each of the filtered output signals comprises a linear combination of the set of sensing signals in which each sensing signal has a respective coefficient, wherein the coefficients in each linear combination sum up to zero, and wherein the linear combinations are different from each other, wherein the set of filtered output signals is obtained by discarding only a single sum output from the Hadamard transform, the single sum output that is discarded comprising a sum of the set of sensing signals resulting from a sum operator corresponding to Hadamard matrix elements of the same sign, and
converting the set of filtered output signals to a set of filtered digital sensing signals indicative of the user's fingerprint pattern.

2. The method according to claim 1, wherein the number of sensing elements in the set of sensing elements is an even number of sensing elements.

3. The method according to claim 1, wherein the set of sensing elements is a first set of sensing elements, the method comprising:
receiving analog sensing signals from a second set of sensing elements comprising at least four sensing elements, the sensing elements of the second set are not comprised in the first set of sensing elements,
filtering the set of analog sensing signals from the second set of sensing elements to provide a further set of filtered output signals, each of the further filtered output signals comprises a linear combination of the set of sensing signals from the second set of sensing elements in which each sensing signal has a respective coefficient, wherein the coefficients in each linear combination sum up to zero, and wherein the linear combinations are different from each other,
converting the second set of filtered output signals to a second set of filtered digital sensing signal indicative of the user's fingerprint pattern,
combining the first set of filtered digital sensing signal with the second set of filtered digital sensing signal.

4. The method according to claim 3, wherein the number of sensing elements in the first set is equal to the number of sensing elements in the second set.

5. The method according to claim 3, wherein the first set of sensing signals and the second set of sensing signals are acquired substantially simultaneously.

6. The method according to claim 1, comprising:
shifting the set of sensing element to a further set of sensing element overlapping with at least one sensing element from the first set of sensing element, and providing a further filtered digital sensing signal based on sensing signals from the further set of sensing elements.

7. A fingerprint sensing arrangement for sensing a fingerprint pattern of a user's finger for providing a fingerprint pattern signal, the fingerprint sensing arrangement comprising:
an array of sensing elements for sensing the fingerprint pattern, each sensing element is configured to provide a sensing signal indicative of a local fingerprint pattern feature,
a filter bank configured to suppress common mode noise, and configured to receive analog sensing signals from each of a set of sensing elements comprising at least four sensing elements,
the filter bank is further configured to compute a Hadamard transform of each set of sensing signals to calculate a set of filtered output signals, each of the filtered output signals comprises a linear combination of the set of sensing signals in which each sensing signal is associated with a respective coefficient, wherein the coefficients in each linear combination sum up to zero and wherein the linear combinations are different from each other, wherein the set of filtered output signals is obtained by discarding only a single sum output from the Hadamard transform, the single sum output that is discarded comprising a sum of the set of sensing signals resulting from a sum operator corresponding to Hadamard matrix elements of the same sign, and
an analog to digital converter configured to convert the set of filtered output signals to set of filtered digital sensing signal indicative of the user's fingerprint pattern.

8. The fingerprint sensing arrangement according to claim 7, wherein the filter bank comprises a plurality of adding circuits and a plurality of subtraction circuits for calculating the set of filtered output signals.

9. The fingerprint sensing arrangement according to claim 7, wherein each sensing element comprises:
a sensing structure for capacitive coupling with the finger, each sensing structure being covered by a dielectric structure, and
sensing circuitry for providing the sensing signals which are indicative of the capacitive coupling between the sensing structure and the finger in response to a change in potential difference between a sensing structure potential of the sensing structure and a finger potential of the finger.

* * * * *